(12) United States Patent
Zhang et al.

(10) Patent No.: US 10,622,004 B1
(45) Date of Patent: Apr. 14, 2020

(54) ACOUSTIC ECHO CANCELLATION USING LOUDSPEAKER POSITION

(71) Applicant: Amazon Technologies, Inc., Seattle, WA (US)

(72) Inventors: Xianxian Zhang, Santa Clara, CA (US); Trausti Thor Kristjansson, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/105,406

(22) Filed: Aug. 20, 2018

(51) Int. Cl.
G10L 21/0232 (2013.01)
H04R 1/40 (2006.01)
H04R 3/00 (2006.01)
G10L 25/78 (2013.01)
G10L 15/22 (2006.01)
G10L 21/0208 (2013.01)

(52) U.S. Cl.
CPC .......... G10L 21/0232 (2013.01); G10L 15/22 (2013.01); G10L 25/78 (2013.01); H04R 1/406 (2013.01); H04R 3/005 (2013.01); G10L 2015/223 (2013.01); G10L 2021/02082 (2013.01); H04R 2420/07 (2013.01)

(58) Field of Classification Search
CPC ..... G10L 21/0232; G10L 15/22; G10L 25/78; G10L 2015/223; G10L 2021/02082; G10L 2021/02166; G10L 2021/02165; H04R 1/406; H04R 3/005; H04R 2420/07; H04R 2203/12; H04R 2430/25; H04M 9/082; G10K 2210/505; G10K 2210/3046
USPC ....... 381/66, 71.1, 92, 94.1, 56, 58, 122, 57, 381/107; 379/406.01, 406.03, 406.05; 455/570, 563
See application file for complete search history.

(56) References Cited

U.S. PATENT DOCUMENTS

| 2007/0053524 A1* | 3/2007 | Haulick | H04M 9/082 381/92 |
| 2010/0014690 A1* | 1/2010 | Wolff | H04R 3/005 381/92 |
| 2014/0119552 A1* | 5/2014 | Beaucoup | H04M 9/082 381/66 |
| 2017/0178662 A1* | 6/2017 | Ayrapetian | G10L 21/0216 |

* cited by examiner

Primary Examiner — Norman Yu
(74) Attorney, Agent, or Firm — Pierce Atwood LLP

(57) ABSTRACT

Techniques for improving acoustic echo cancellation to attenuate an echo signal generated by a wireless loudspeaker are described. A relative position of the wireless loudspeaker is determined when sound from the wireless loudspeaker is determined to be the dominant sound (e.g., during output of a response to a user command or query or during speech by a far-side party during a two-way audio communication). A beam corresponding to the relative position is thereby selected for echo cancellation.

20 Claims, 11 Drawing Sheets

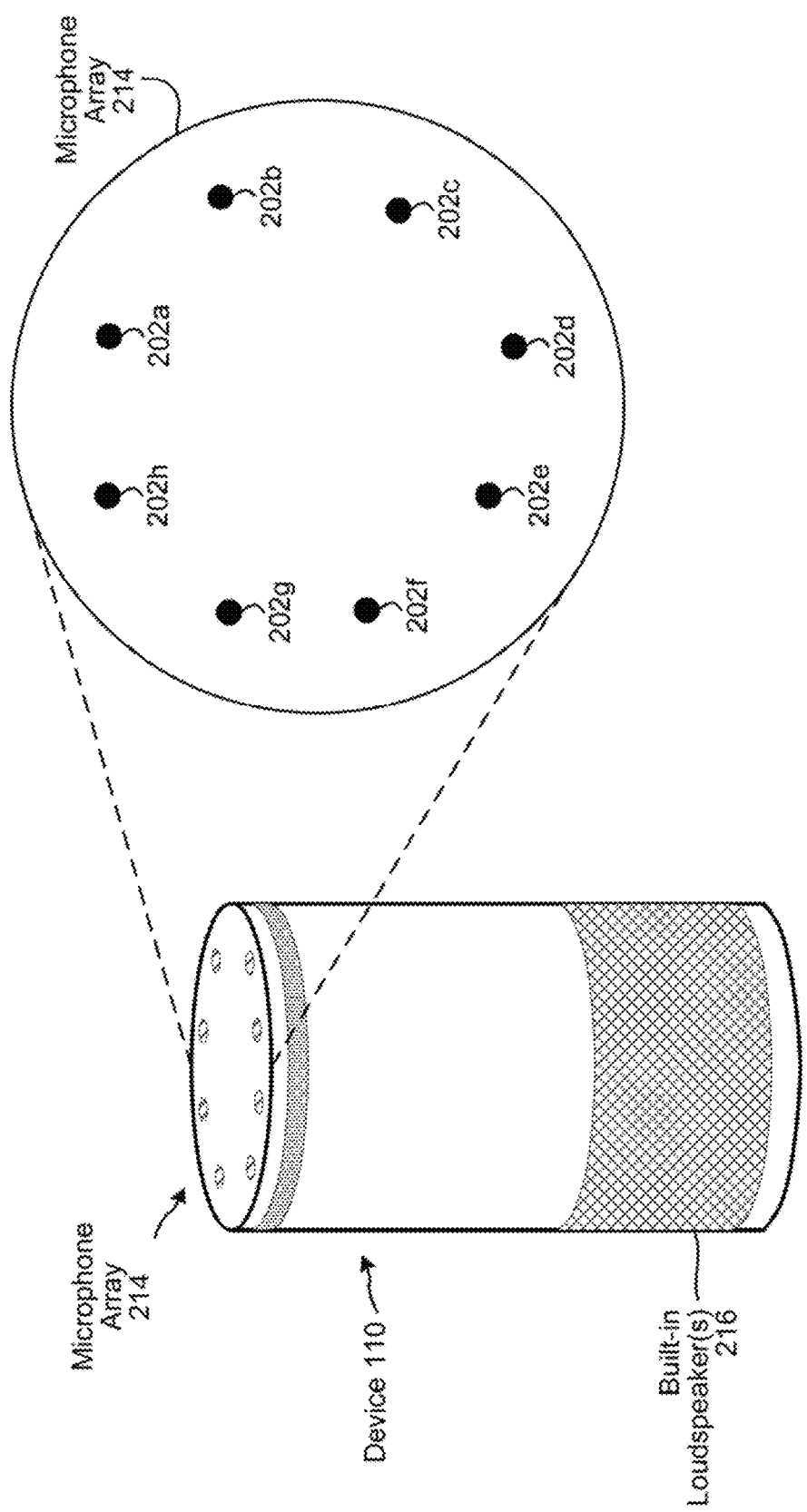

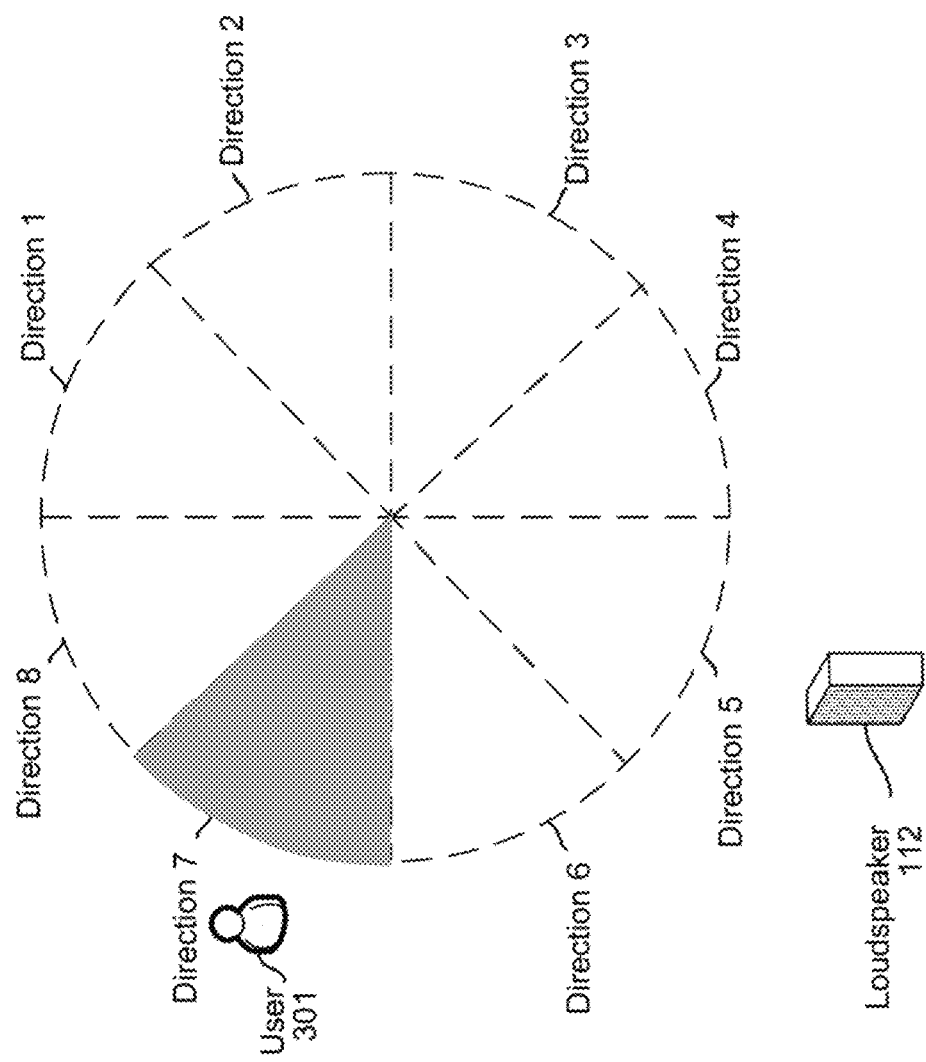

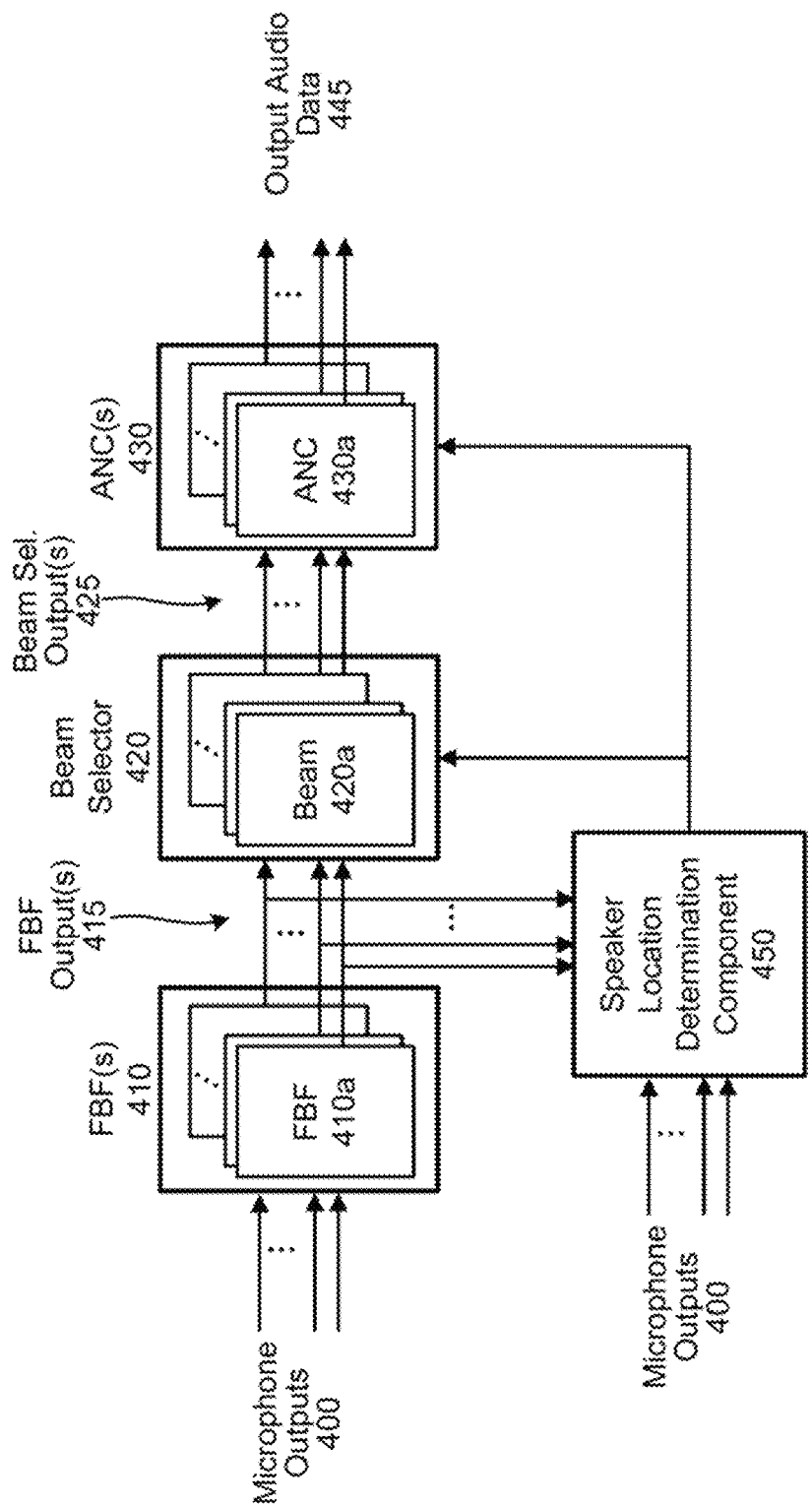

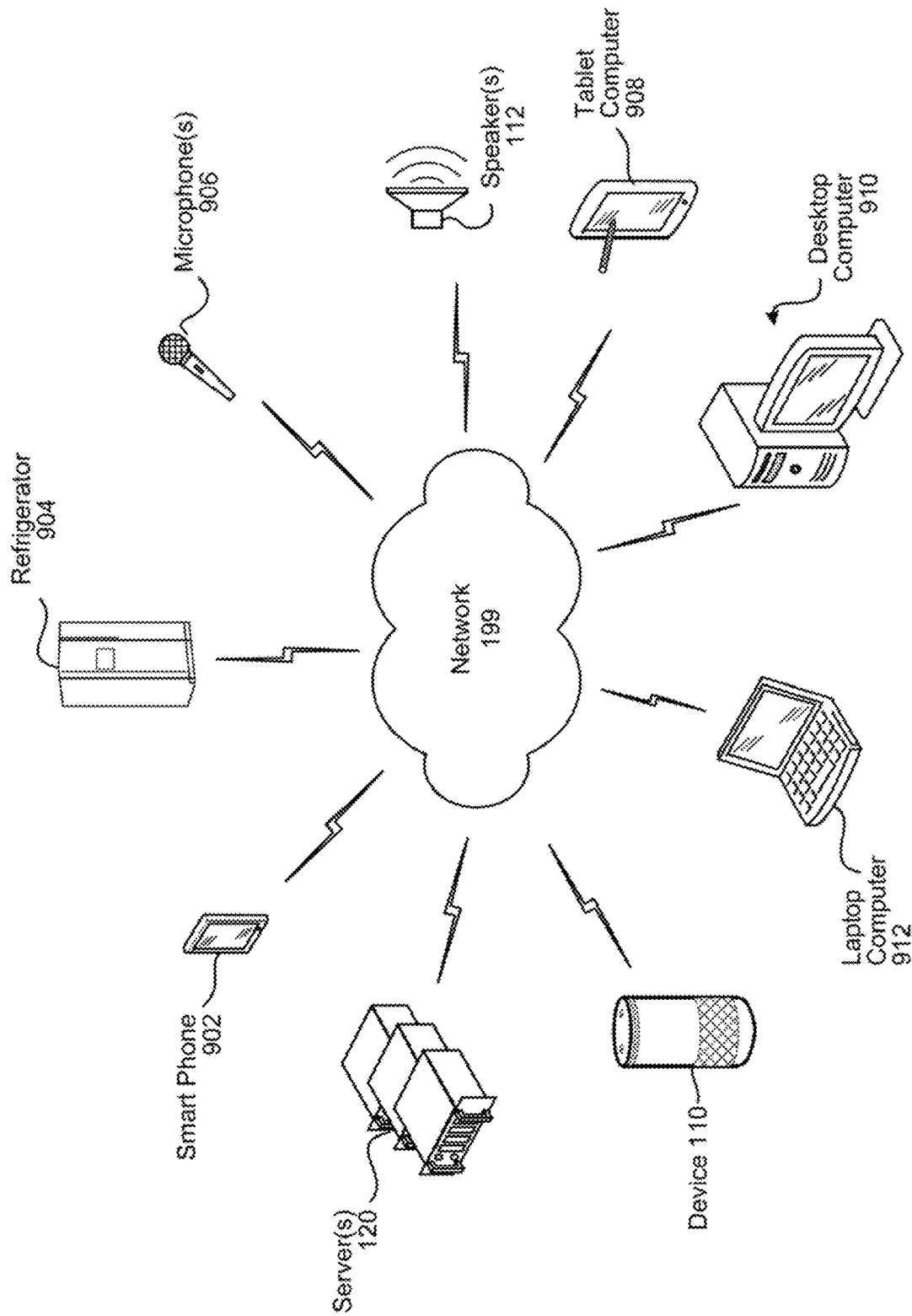

ACOUSTIC ECHO CANCELLATION USING LOUDSPEAKER POSITION

BACKGROUND

In audio systems, beamforming refers to techniques that are used to isolate audio from a particular direction. Beamforming may be particularly useful when filtering out noise from non-desired directions. Beamforming may be used for various tasks, including isolating voice commands to be executed by a speech-processing system.

BRIEF DESCRIPTION OF DRAWINGS

For a more complete understanding of the present disclosure, reference is now made to the following description taken in conjunction with the accompanying drawings.

FIG. 2 illustrates a microphone array according to embodiments of the present disclosure.

FIGS. 3B and 3C illustrate isolating audio from a direction to focus on a desired audio source according to embodiments of the present disclosure.

FIG. 4 illustrates a system for echo cancellation that includes speaker location determination according to embodiments of the present disclosure.

FIG. 9 illustrates a network including a system for echo cancellation that includes speaker location determination according to embodiments of the present disclosure.

DETAILED DESCRIPTION

Figure 1:
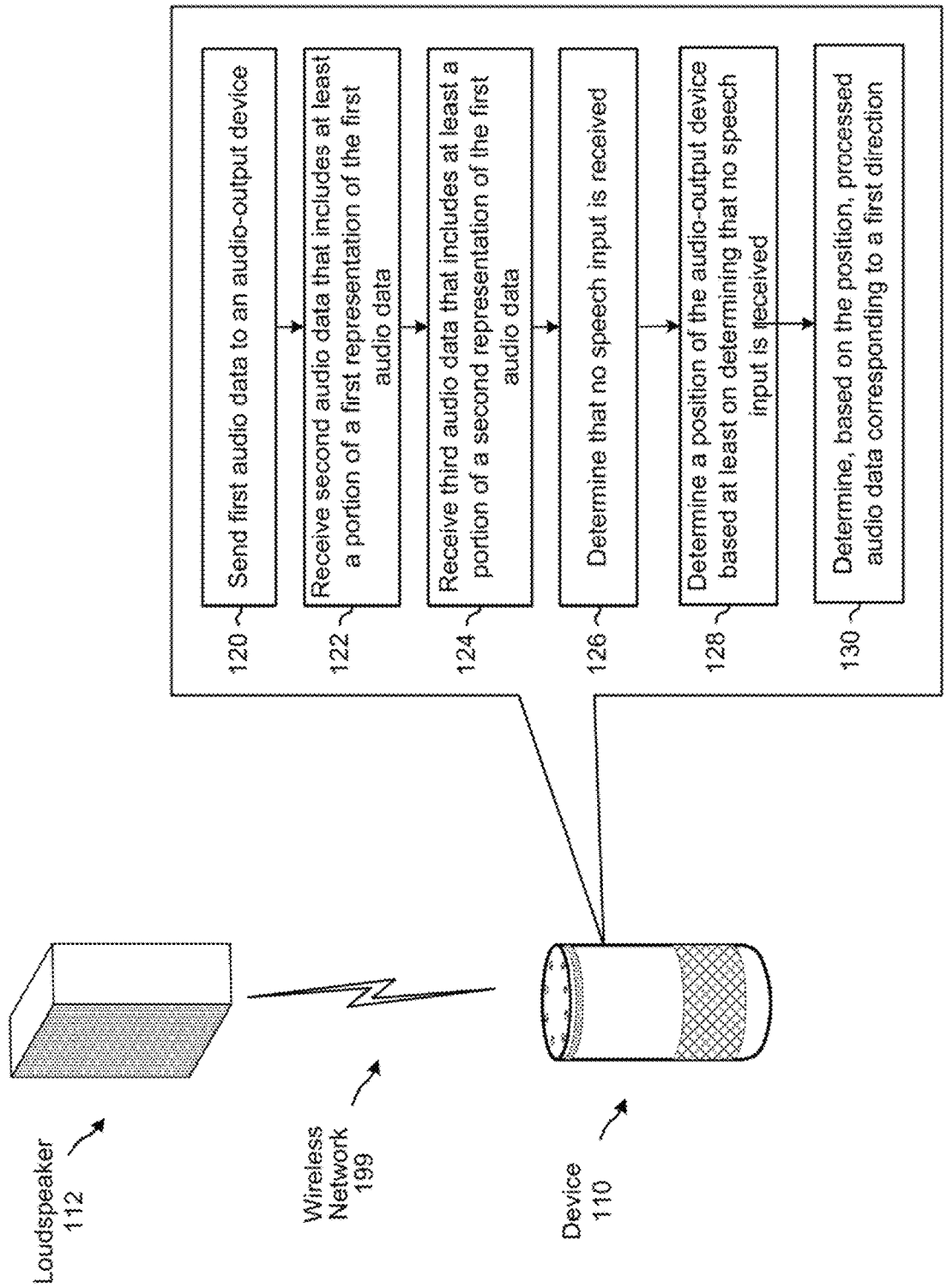
FIG. 1 illustrates a method for improving beam selection and reducing algorithm complexity according to embodiments of the present disclosure.

Speech recognition systems have progressed to the point where humans can interact with computing devices using speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices, such as those with beamforming capability, to improve human-computer interactions.

In audio systems, beamforming refers to techniques that are used to isolate audio from a particular direction. Beamforming may be particularly useful when filtering out noise from non-desired directions. Beamforming may be used for various tasks, including isolating voice commands to be executed by a speech-processing system.

Certain devices capable of capturing speech for speech processing may operate using a microphone array comprising multiple microphones, where beamforming techniques may be used to isolate desired audio including speech. Beamforming systems isolate audio from a particular direction in a multi-directional audio capture system. One technique for beamforming involves boosting audio received from a desired direction while dampening audio received from a non-desired direction.

In one example of a beamformer system, a fixed beamformer unit employs a filter-and-sum structure to boost an audio signal that originates from a desired direction (sometimes referred to as the look-direction) while largely attenuating audio signals that original from other directions. A fixed beamformer unit may effectively eliminate certain diffuse noise (e.g., undesirable audio), which is detectable in similar energies from various directions, but may be less effective in eliminating noise emanating from a single source in a particular non-desired direction. The beamformer unit may thus instead or in addition include an adaptive beamformer unit/noise canceller that may adaptively cancel noise from different directions depending on audio conditions.

Acoustic echo cancellation (AEC) techniques may be used to avoid capturing, with the microphone array, audio output by the device itself and re-playing the captured audio over the loudspeaker. This "echo" may occur whenever the microphone array and loudspeaker are active at the same time and may repeat one or more times; the echo may fade after a certain number of repeats or may repeat indefinitely. To avoid this undesirable echo, the device may subtract the output audio from input audio signals received from the microphone array. This subtraction, however, requires that the output audio signal be well-defined in amplitude and time; if the output audio signal is shifted forward or back in time, its subtraction from the input signal will not be ideal, and the echo will be wholly or partially un-cancelled.

To improve acoustic echo cancellation, systems and methods are disclosed that determine a location of a wirelessly connected speaker (e.g., a Bluetooth speaker) and use beamforming techniques to attenuate audio output by the speaker. In some embodiments, audio data is sent from the device to the speaker using a wireless network, such as a Bluetooth or Wi-Fi network; the transmission time of the audio data over the wireless network may vary due to, for example, noise, dropped packets, or other such errors, or may even be an intrinsic property of the network. The variable transmission time means that the device may not be able to perform effective echo cancellation of audio output by the speaker due to not knowing the time of output of the audio output. In various embodiments, the device determines the position of the speaker when other sources of near-end audio, such as a user, are silent or have volumes less than a volume threshold. The device then selects a beam corresponding to the position and attenuates audio received on that beam.

FIG. 1 illustrates a system that includes a voice-controlled device 110 that may include a microphone array, a loudspeaker, and one or more network connections. The voice-controlled device 110 may be, for example, a smart speaker, smart phone, or other such device. The disclosure is not, however, limited to only these devices or components, and the voice-controlled device 110 may include additional components without departing from the disclosure. The voice-controlled device 110 is connected, using a wireless network 199, to a loudspeaker 112. The voice-controlled device 110 may output audio, such as voice, tones, music, or other audio; the voice-controlled device 110 may instead or in addition send audio data over the network 199 to the loudspeaker 112, which may also or instead output the audio. The loudspeaker 112 may be used with or instead of the voice-controlled device 110 to output audio because it may be capable of louder sound output or better sound quality or because the loudspeaker 112 may be positioned closer to a user or listener.

The device 110 may receive playback audio data and may generate output audio corresponding to the playback audio data using the one or more loudspeaker(s) 112. While generating the output audio, the device 110 may capture input audio data using a microphone array. In addition to capturing desired speech (e.g., the input audio data includes a representation of speech from a first user), the device 110 may capture a portion of the output audio generated by the loudspeaker(s) 112, which may be referred to as an "echo" or echo signal, along with additional acoustic noise (e.g., undesired speech, ambient acoustic noise in an environment around the device 110, etc.).

Conventional systems isolate the speech in the input audio data by performing acoustic echo cancellation (AEC) to remove the echo signal from the input audio data. For example, conventional acoustic echo cancellation may generate a reference signal based on the playback audio data and may remove the reference signal from the input audio data to generate output audio data representing the speech.

As an alternative to generating the reference signal based on the playback audio data, Adaptive Reference Algorithm (ARA) processing may generate an adaptive reference signal based on the input audio data. To illustrate an example, the ARA processing may perform beamforming using the input audio data to generate a plurality of audio signals (e.g., beamformed audio data) corresponding to particular directions. For example, the plurality of audio signals may include a first audio signal corresponding to a first direction, a second audio signal corresponding to a second direction, a third audio signal corresponding to a third direction, and so on. The ARA processing may select the first audio signal as a target signal (e.g., the first audio signal includes a representation of speech) and the second audio signal as a reference signal (e.g., the second audio signal includes a representation of the echo and/or other acoustic noise) and may perform AEC by removing (e.g., subtracting) the reference signal from the target signal. As the input audio data is not limited to the echo signal, the ARA processing may remove other acoustic noise represented in the input audio data in addition to removing the echo. Therefore, the ARA processing may be referred to as performing AEC, adaptive noise cancellation (ANC), and/or adaptive interference cancellation (AIC) (e.g., adaptive acoustic interference cancellation) without departing from the disclosure. As discussed in greater detail below, the device 110 may include an adaptive beamformer and may be configured to perform AEC/ANC/AIC using the ARA processing to isolate the speech in the input audio data.

In some examples, the system may use virtual microphones to reduce a number of physical microphones included in the microphone array 214 without significantly degrading the beamformed audio data. Additionally or alternatively, the system may use virtual microphones without reducing the number of physical microphones included in the microphone array 214 to improve the beamformed audio data. This improvement is at least in part because these "virtual" filter coefficient values correct for errors inherent in the "actual" filter coefficient values associated with the physical microphones. For example, the "actual" filter coefficient values (e.g., filter coefficient values determined based on an actual position of the physical microphone) are determined for a specific direction of interest, but due to limitations inherent in determining the filter coefficient values, the "actual" filter coefficient values may not precisely correspond to the direction of interest. Using virtual microphones, the system may identify a "virtual" filter coefficient value (e.g., filter coefficient values determined based on a different position than the physical microphone) that corrects for the error inherent in the "actual" filter coefficient value. Thus, the virtual filter coefficient value improves beamforming as it more accurately corresponds to the direction of interest.

Typically, beamforming is done by determining filter coefficient values (e.g., Finite Impulse Response (FIR) filter coefficient values) for each beam direction (e.g., look direction, direction of interest, etc.) based on a position of physical microphones in the microphone array 214. For example, a first position of a first physical microphone may correspond to a first filter coefficient associated with a first direction and a second position of a second physical microphone may correspond to a second filter coefficient associated with the first direction. Thus, to generate beamformed audio data in the first direction, the beamformer may apply the first filter coefficient value to first audio data captured by the first physical microphone and apply the second filter coefficient value to second audio data captured by the second physical microphone.

To further improve beamforming, the system may determine filter coefficient values (e.g., Finite Impulse Response (FIR) filter coefficient values) for a plurality of virtual microphones and perform simulations to select the best filter coefficient value for each physical microphone and each direction of interest. Whereas the physical microphones are at fixed positions on the device 110, the virtual microphones may correspond to any position on the device 110, including a position that doesn't correspond to a physical microphone. For example, the system may determine a radius associated with two physical microphones, may determine a desired number of virtual microphones (e.g., 6, 8, 12, 16, 24, 36, etc.), and may determine positions of the virtual microphones in a circle based on radius and the desired number of virtual microphones.

After determining the positions of the virtual microphones, the system may determine filter coefficient values associated with each direction of interest for each of the virtual microphones. The filter coefficient values may be determined using minimum variance distortionless response (MVDR) beamformer techniques, Linearly Constrained Minimum Variance (LCMV) beamformer techniques, and/or generalized eigenvalue (GEV) beamformer techniques, although the disclosure is not limited thereto and the filter coefficient values may be determined using any technique known to one of skill in the art without departing from the disclosure.

The system may perform a plurality of simulations, applying filter coefficient values associated with each of the virtual microphones to each of the physical microphones, and may determine the best filter coefficient values for each direction of interest. For example, the system may associate a first filter coefficient value corresponding to a first virtual microphone with a first physical microphone and a first direction of interest, but associate a second filter coefficient value corresponding to a fourth virtual microphone with the first physical microphone and a second direction of interest. Thus, the filter coefficient values may be selected based on the simulation results to improve the results of beamforming. In some examples, using the virtual microphones may increase the output audio data generated by beamforming by 6-12 decibels (dB) in the direction of a loudspeaker, although this is provided as an example and the disclosure is not limited thereto. The filter coefficient values are fixed and the device 110 may generate beamformed audio data using the same filter coefficient values over time.

As discussed above, the device 110 may perform beamforming (e.g., perform a beamforming operation to generate beamformed audio data corresponding to individual directions). As used herein, beamforming (e.g., performing a beamforming operation) corresponds to generating a plurality of directional audio signals (e.g., beamformed audio data) corresponding to individual directions relative to the microphone array. For example, the beamforming operation may individually filter input audio signals generated by multiple microphones in the microphone array (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on. In some examples, the device 110 may generate the beamformed audio data by boosting an audio signal originating from the desired direction (e.g., look direction) while attenuating audio signals that originate from other directions, although the disclosure is not limited thereto.

To perform the beamforming operation, the device 110 may apply directional calculations to the input audio signals. In some examples, the device 110 may perform the directional calculations by applying filters to the input audio signals using filter coefficient values associated with specific directions. For example, the device 110 may perform a first directional calculation by applying first filter coefficient values to the input audio signals to generate the first beamformed audio data and may perform a second directional calculation by applying second filter coefficient values to the input audio signals to generate the second beamformed audio data.

The filter coefficient values used to perform the beamforming operation may be calculated offline (e.g., preconfigured ahead of time) and stored in the device 110. For example, the device 110 may store filter coefficient values associated with hundreds of different directional calculations (e.g., hundreds of specific directions) and may select the desired filter coefficient values for a particular beamforming operation at runtime (e.g., during the beamforming operation). To illustrate an example, at a first time the device 110 may perform a first beamforming operation to divide input audio data into 36 different portions, with each portion associated with a specific direction (e.g., 10 degrees out of 360 degrees) relative to the device 110. At a second time, however, the device 110 may perform a second beamforming operation to divide input audio data into 6 different portions, with each portion associated with a specific direction (e.g., 60 degrees out of 360 degrees) relative to the device 110.

These directional calculations may sometimes be referred to as "beams" by one of skill in the art, with a first directional calculation (e.g., first filter coefficient values) being referred to as a "first beam" corresponding to the first direction, the second directional calculation (e.g., second filter coefficient values) being referred to as a "second beam" corresponding to the second direction, and so on. Thus, the device 110 stores hundreds of "beams" (e.g., directional calculations and associated filter coefficient values) and uses the "beams" to perform a beamforming operation and generate a plurality of beamformed audio signals. However, "beams" may also refer to the output of the beamforming operation (e.g., plurality of beamformed audio signals). Thus, a first beam may correspond to first beamformed audio data associated with the first direction (e.g., portions of the input audio signals corresponding to the first direction), a second beam may correspond to second beamformed audio data associated with the second direction (e.g., portions of the input audio signals corresponding to the second direction), and so on. For ease of explanation, as used herein "beams" refer to the beamformed audio signals that are generated by the beamforming operation. Therefore, a first beam corresponds to first audio data associated with a first direction, whereas a first directional calculation corresponds to the first filter coefficient values used to generate the first beam.

After beamforming, the device 110 may optionally perform adaptive interference cancellation using the ARA processing on the beamformed audio data. For example, after generating the plurality of audio signals (e.g., beamformed audio data) as described above, the device 110 may determine one or more target signal(s), determine one or more reference signal(s), and generate output audio data by subtracting at least a portion of the reference signal(s) from the target signal(s).

The device 110 may dynamically select target signal(s) and/or reference signal(s). Thus, the target signal(s) and/or the reference signal(s) may be continually changing over time based on speech, acoustic noise(s), ambient noise(s), and/or the like in an environment around the device 110. For example, the adaptive beamformer may select the target signal(s) by detecting speech, based on signal strength values (e.g., signal-to-noise ratio (SNR) values, average power values, etc.), and/or using other techniques or inputs, although the disclosure is not limited thereto. As an example of other techniques or inputs, the device 110 may capture video data corresponding to the input audio data, analyze the video data using computer vision processing (e.g., facial recognition, object recognition, or the like) to determine that a user is associated with a first direction, and select the target signal(s) by selecting the first audio signal corresponding to the first direction. Similarly, the device 110 may identify the reference signal(s) based on the signal strength values and/or using other inputs without departing from the disclosure. Thus, the target signal(s) and/or the reference signal(s) selected by the device 110 may vary, resulting in different filter coefficient values over time.

As discussed above, the device 110 may perform beamforming (e.g., perform a beamforming operation to generate beamformed audio data corresponding to individual directions). As used herein, beamforming (e.g., performing a beamforming operation) corresponds to generating a plurality of directional audio signals (e.g., beamformed audio data) corresponding to individual directions relative to the microphone array. For example, the beamforming operation may individually filter input audio signals generated by multiple microphones in the microphone array 214 (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on. In some examples, the device 110 may generate the beamformed audio data by boosting an audio signal originating from the desired direction (e.g., look direction) while attenuating audio signals that originate from other directions, although the disclosure is not limited thereto.

To perform the beamforming operation, the device 110 may apply directional calculations to the input audio signals. In some examples, the device 110 may perform the directional calculations by applying filters to the input audio signals using filter coefficients associated with specific directions. For example, the device 110 may perform a first directional calculation by applying first filter coefficients to the input audio signals to generate the first beamformed audio data and may perform a second directional calculation by applying second filter coefficients to the input audio signals to generate the second beamformed audio data.

The filter coefficients used to perform the beamforming operation may be calculated offline (e.g., preconfigured ahead of time) and stored in the device 110. For example, the device 110 may store filter coefficients associated with hundreds of different directional calculations (e.g., hundreds of specific directions) and may select the desired filter coefficients for a particular beamforming operation at runtime (e.g., during the beamforming operation). To illustrate an example, at a first time the device 110 may perform a first beamforming operation to divide input audio data into 36 different portions, with each portion associated with a specific direction (e.g., 10 degrees out of 360 degrees) relative to the device 110. At a second time, however, the device 110 may perform a second beamforming operation to divide input audio data into 6 different portions, with each portion associated with a specific direction (e.g., 60 degrees out of 360 degrees) relative to the device 110.

These directional calculations may sometimes be referred to as "beams" by one of skill in the art, with a first directional calculation (e.g., first filter coefficients) being referred to as a "first beam" corresponding to the first direction, the second directional calculation (e.g., second filter coefficients) being referred to as a "second beam" corresponding to the second direction, and so on. Thus, the device 110 may store many (e.g., hundreds) of "beams" (e.g., directional calculations and associated filter coefficients) and uses the "beams" to perform a beamforming operation and generate a plurality of beamformed audio signals. However, "beams" may also refer to the output of the beamforming operation (e.g., plurality of beamformed audio signals). Thus, a first beam may correspond to first beamformed audio data associated with the first direction (e.g., portions of the input audio signals corresponding to the first direction), a second beam may correspond to second beamformed audio data associated with the second direction (e.g., portions of the input audio signals corresponding to the second direction), and so on. For ease of explanation, as used herein, "beams" refer to the beamformed audio signals that are generated by the beamforming operation. Therefore, a first beam corresponds to first audio data associated with a first direction, whereas a first directional calculation corresponds to the first filter coefficients used to generate the first beam.

The device 110 may send (120) first audio data to an audio-output device (e.g., loudspeaker) 112 using a wireless network 199. The device 110 may receive (122) second audio data from a first microphone; the second audio data includes at least a portion of a first representation of the first audio data. The device 110 may further receive (124) third audio data from a second microphone; the third audio data includes at least a portion of a second representation of the first audio data. The device 110 determines (126) that no speech input is received (e.g., a user is silent) by, for example, determining that the user and a second user are conducting a two-way audio communication and that the second user is speaking, by determining that audio data responsive to a request or command of the user was sent to the loudspeaker 112 and that the user is listening to the audio data, or by other determinations disclosed herein. Based on this determination (and by using the beamforming techniques described herein), the device 110 determines (128) a relative position of the loudspeaker 112 with respect to the device 110. For example, if the device 110 supports eight beams, the device 110 may analyze each beam for the beam having the highest volume level. Based on the relative position, the device 110 determines (130) processed audio data (i.e., a corresponding beam) corresponding to a first direction associated with the position.

In some examples, some or all of the above steps may be performed in the time domain. For example, the device 110 may apply filter coefficient values g(t) in the time domain to the input audio data to generate the beamforming data and may perform acoustic echo cancellation in the time domain. The present disclosure is not, however limited thereto. Instead or in addition, the device 110 may receive first input audio data in the time domain and may perform a transform, such as a Fast Fourier Transform (FFT), on the first input audio data to generate second input audio data in the frequency domain. The device 110 may then apply filter coefficient values g(ω) in the frequency domain to the second input audio data to generate the LCB audio data and may perform acoustic echo cancellation in the frequency domain to generate first modified input audio data. The device 110 may perform an inverse transform, such as an Inverse Fast Fourier Transform (IFFT), on the first modified input audio data to generate second modified input audio data in the time domain. Thus, the device 110 perform beamforming and/or acoustic echo cancellation in the time domain and/or the frequency domain without departing from the disclosure. Additionally or alternatively, the device 110 may perform acoustic echo cancellation in a subband domain without departing from the disclosure. For example, the device 110 may separate different frequency ranges (e.g., subbands) and may perform acoustic echo cancellation differently for each frequency range without departing from the disclosure.

The device 110 may beamform the input audio data into a plurality of beams (e.g., perform a beamforming operation to generate one or more items of processed audio data corresponding to one or more directions). As used herein, the term beam may refer to particular audio data corresponding to the modified input audio data that was captured by the microphone array, where the particular audio data of a beam corresponds to a particular direction. Thus, each beam may include audio data corresponding to a particular direction relative to the device 110. A beamforming unit or component of the device 110 (such as an adaptive beamformer) may divide the modified input audio data into different beams of audio data, each corresponding to a direction.

As illustrated in FIG. 2, the device 110 may include, among other components, a microphone array 214, one or more built-in loudspeaker(s) 216, a beamformer unit (as discussed below), or other components. The microphone array 214 may include a number of different individual microphones. The individual microphones may capture sound and pass the resulting audio signal created by the sound to a downstream component, as discussed below. Each individual piece of audio data captured by a microphone may be in the time domain. To isolate audio from a particular direction, the device 110 may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device 110 may determine that the source of the audio that resulted in the segment of audio data may be located closer to the first microphone than to the second microphone (which resulted in the audio being detected by the first microphone before being detected by the second microphone).

Figure 3A:
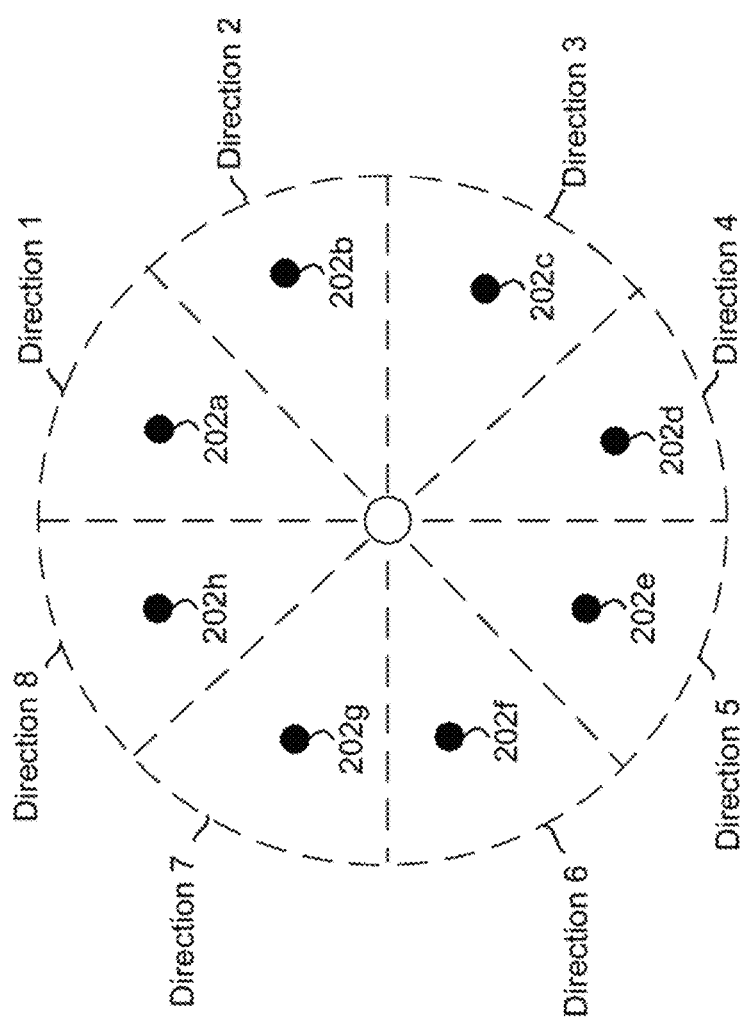
FIG. 3A illustrates associating directions with microphones of a microphone array according to embodiments of the present disclosure.
Figure 3B:
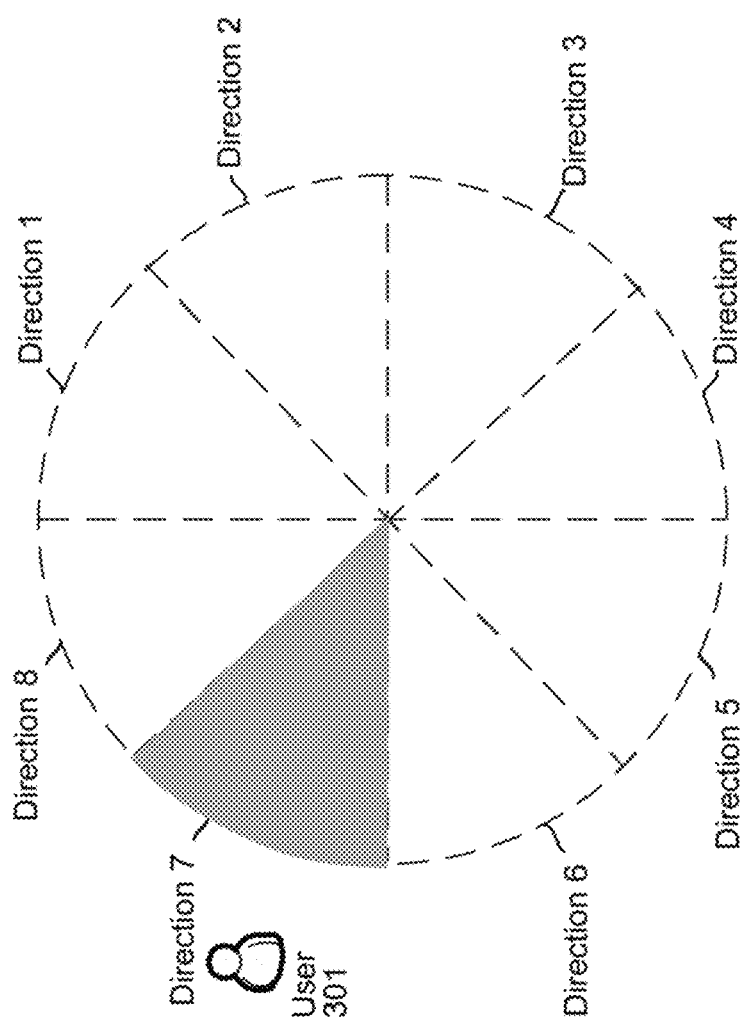

Using such direction isolation techniques, the device 110 may isolate directionality of audio sources. As shown in FIG. 3A, a particular direction may be associated with a particular microphone of a microphone array, where the azimuth angles for the plane of the microphone array may be divided into bins (e.g., 0-45 degrees, 46-90 degrees, and so forth) where each bin direction is associated with a microphone in the microphone array. For example, direction 1 is associated with microphone 202a, direction 2 is associated with microphone 202b, and so on. Alternatively, particular directions and/or beams may not necessarily be associated with a specific microphone. Thus, the present disclosure is not limited to any particular number of microphones or directions, and the number of microphones and directions may differ.

To isolate audio from a particular direction the device 110 may apply a variety of audio filters to the output of the microphones where certain audio is boosted while other audio is dampened, to create isolated audio corresponding to a particular direction, which may be referred to as a beam. While the number of beams may correspond to the number of microphones, this need not be the case. For example, a two-microphone array may be processed to obtain more than two beams, thus using filters and beamforming techniques to isolate audio from more than two directions. Thus, the number of microphones may be more than, less than, or the same as the number of beams. The beamformer unit of the device may have an adaptive beamformer (ABF) unit/fixed beamformer (FBF) unit processing pipeline for each beam.

The device 110 may use various techniques to determine the beam corresponding to the look direction. If audio is detected first by a particular microphone the device 110 may determine that the source of the audio is associated with the direction of the microphone in the array. Other techniques may include determining what microphone detected the audio with a largest amplitude (which in turn may result in a highest strength of the audio signal portion corresponding to the audio). Other techniques (either in the time domain or in the sub-band domain) may also be used such as calculating a signal-to-noise ratio (SNR) for each beam, performing voice activity detection (VAD) on each beam, or the like.

For example, if audio data corresponding to a user's speech is first detected and/or is most strongly detected by microphone 202g, the device may determine that the user is located in a location in direction 7. Using a fixed beamformer unit or other such component, the device may isolate audio coming from direction 7 using techniques known to the art and/or explained herein. Thus, as shown in FIG. 4B, the device 110 may boost audio coming from direction 7, thus increasing the amplitude of audio data corresponding to speech from user 301 relative to other audio captured from other directions. In this manner, noise from diffuse sources that is coming from all the other directions will be dampened relative to the desired audio (e.g., speech from user 301) coming from direction 7.

In various embodiments, with reference to FIG. 3C, the device 110 may be disposed proximate the user 301 in a direction 7 and the loudspeaker 112 (or other source of audio) in another direction 5. In order to cancel echoes originating from the loudspeaker 112, as explained herein, the device 110 may determine that sound output by the user 301 is below a volume threshold and then determine that the loudspeaker 112 is disposed at direction 5 using the beamforming techniques described herein.

FIG. 4 illustrates a system for echo cancellation that includes speaker location determination according to embodiments of the present disclosure. In various embodiments, two or more microphones 202 create audio data 400 corresponding to audio. The audio data 400 is received by a fixed beamformer 410 having one or more fixed beamforming units. The fixed beamformer 410 may isolate audio from a desired direction by boosting audio received from the desired direction while dampening audio received from a non-desired direction. For example, each of the FBF units 410 may include a filter-and-sum structure to boost an audio signal that originates from the desired direction (e.g., look-direction) while largely attenuating audio signals that originate from other directions.

A number of fixed beamformer units included in the fixed beamformer 410 may depend on a desired number of beams. For example, to generate twelve beams, the device 110 may include twelve separate fixed beamformer units, with each fixed beamformer unit processing the microphone outputs 400 to generate an individual beam (e.g., directional output, directional audio signal, beamformed audio data, or the like) corresponding to a particular direction. The fixed beamformer 410 may generate fixed beamformer outputs 415, which correspond to the desired number of beams. Thus, the microphone outputs 400 are separated into a plurality of audio signals, enabling the device 110 to process audio data associated with a particular direction.

The number of microphone outputs 400 and the number of fixed beamformer outputs 415 may not be the same. The number of audio channels included in the microphone outputs 400 and/or the number of beams are typically factors of two (e.g., 2, 4, 6, 8, 12, etc.), although the disclosure is not limited thereto. For example, the microphone array 214 may include eight microphones whereas the device 110 may generate twelve beams. Additionally or alternatively, the number of audio channels included in the microphone outputs 400 and the number of beams may be the same without departing from the disclosure.

The fixed beamformer 410 may output the fixed beamformer outputs 415 to a beam selector 420. The beam selector 420 may select one or more of the beamformer outputs 415 as output beams 425. For example, the beam selector 420 may determine one or more signal quality metrics (e.g., loudness, SNR, power value, signal-to-noise plus interference ratio (SINR), and/or other signal quality metrics known to one of skill in the art) associated with each of the fixed beamformer outputs 415 and may select the fixed beamformer output 415 having the highest signal quality metric as the output beam(s) 425.

Each particular FBF unit may be tuned with filter coefficient values to boost audio from one of the particular beams. For example, FBF unit 410a may be tuned to boost audio from beam 1, FBF unit 410b may be tuned to boost audio from beam 2 and so forth. If the filter block is associated with the particular beam, its beamformer filter coefficient h will be high whereas if the filter block is associated with a different beam, its beamformer filter coefficient h will be lower. For example, for FBF unit 410g corresponding to direction 7, the beamformer filter coefficient $h_7$ for its filter may be high while other beamformer filter coefficient values may be lower. Thus the selected filtered audio signal will be comparatively stronger than the other filtered audio signals thus boosting audio from direction 7 relative to the other directions. The filtered audio signals will then be summed together to create the output audio signal The filtered audio signals will then be summed together to create the output audio signal. Thus, the FBF unit 410 may phase-align microphone audio data toward a given direction and add it up. So signals that are arriving from a particular direction are reinforced, but signals that are not arriving from the look direction are suppressed. The robust FBF coefficients are designed by solving a constrained convex optimization problem and by specifically taking into account the gain and phase mismatch on the microphones.

The individual beamformer filter coefficient values may be represented as $H_{BF,m}(r)$, where r=0, . . . R, where R denotes the number of beamformer filter coefficient values in the subband domain. Thus, the output $Y_f$ of the filter and sum unit may be represented as the summation of each microphone signal filtered by its beamformer coefficient and summed up across the M microphones:

$$Y(k, n) = \sum_{m=1}^{M} \sum_{r=0}^{R} H_{BF,m}(r) X_m(k, n-r) \quad (1)$$

The output beam(s) 425 are input to adaptive noise cancellation (ANC) component(s) 430. The ANC components 430 may perform adaptive noise cancellation on the output beam(s) 425. For example, a first ANC component 430a may use a first output beam 425a corresponding to a first direction as a target signal. The first ANC component 430a may estimate a noise reference signal using the remaining audio signals (e.g., audio signals not associated with the first direction, such as a second output beam 425b corresponding to a second direction) and may subtract the noise reference signal from the first output beam 425a. Thus, the output of the first ANC 430a corresponds to audio data associated with the first direction after noise and/or interference is cancelled from the other directions.

A number of ANC components included in the ANCs 430 may depend on the desired number of beams and/or the number of output beam(s) 425. For example, if there are two beams output by the beam selector 420, the device 110 may include two ANCs 430 configured to perform adaptive noise cancellation and generate audio output data 445. However, the disclosure is not limited thereto and the number of ANC components included in the ANCs 430 may vary without departing from the disclosure.

In various embodiments of the present invention, a speaker-location determination component 450 determines a location or position of a loudspeaker 112 relative to the device 110. As mentioned above, the speaker-location determination component 450 may first determine that no speech input is received (e.g., the user 301 is silent) before selecting a beam that may correspond to the loudspeaker 112 because, as also mentioned above, audio output by the user 301 and audio output by the loudspeaker 112 may be difficult or impossible to distinguish, especially if the audio output by the user 301 is louder in volume than the audio output by the loudspeaker 112 and/or if the loudspeaker 112 is outputting audio that includes voice data. If the speaker-location determination component 450 erroneously selects a beam corresponding to the position of the user 301 for echo cancellation, further audio output by the loudspeaker 112 may be distorted or garbled.

The speaker-location determination component 450 may determine that the user 301 is silent by using any of the techniques or methods disclosed here. In some embodiments, the speaker-location determination component 450 determines that the user 301 has uttered a command, request, or other such instruction for the device 110 and that the loudspeaker 112 then outputs audio responsive to the request. Because the loudspeaker 112 is outputting the audio, the speaker-location determination component 450 determines that the user 301 is listening to the audio and is therefore silent. In other embodiments, the speaker-location determination component 450 determines that the user 301 is participating in a two-way audio communication with a remote party and, the remote party is speaking, and that the loudspeaker 112 is outputting audio corresponding to the remote party speaking. Because the loudspeaker 112 is outputting the audio, the speaker-location determination component 450 determines that the user 301 is listening to the audio and is therefore silent.

Once the speaker-location determination component 450 determines that the user is silent, it may analyze the outputs of the fixed beamformer 410 and determine which beam includes sound corresponding to the greatest volume with respect to the other beams. The beam having the loudest volume may therefore be selected as the beam corresponding to the position of the loudspeaker 112. In other embodiments, the speaker-location determination component 450 may select a beam based on, for example, a vocal characteristic—such as pitch, timber, or other such vocal characteristic—associated with a speaker to thereby distinguish between a near-side speaker and a far-side (i.e., remote) speaker. A first beam corresponding to the near-side speaker may, for example, lack the vocal characteristic but a second beam corresponding to the loudspeaker 112 (which output speech corresponding to the far-side speaker) may include the vocal characteristic. The speaker-location determination component 450 may further select a beam based on identification audio data such as a known tone, sound, or other such data sent to the loudspeaker 112 for playback. For example, the device 110 may send audio data corresponding to a particular frequency, which may be outside a range of frequencies audible to humans, to the loudspeaker 112, and the speaker-location determination component 450 may select a beam based on it containing the particular frequency.

The speaker-location determination component 450 may thereafter update the determined relative position and corresponding beam to reflect any relative motion or movement with respect to the device 110 and loudspeaker 112. The speaker-location determination component 450 may monitor the beams for evidence of movement continually or periodically (for example, every five, ten, or thirty seconds). In some embodiments, the speaker-location determination component 450 monitors the beams for evidence of movement during playback of a response to a command or query by the user or when a far-side speaker is speaking during a two-way audio communication. The present disclosure is not limited to only a single wireless loudspeaker 112, and the speaker-location determination component 450 may select multiple beams corresponding to multiple wireless loudspeakers 112.

The speaker-location determination component 450 may store, in a computer memory, relative position and/or beam selection history. The history information may be used by the speaker-location determination component 450 in selecting a current beam; for example, if a candidate beam differs too greatly in position from one or more beams in the history, the speaker-location determination component 450 may determine that the candidate beam is selected in error and opt to not select the candidate beam as a new beam.

Figure 5:
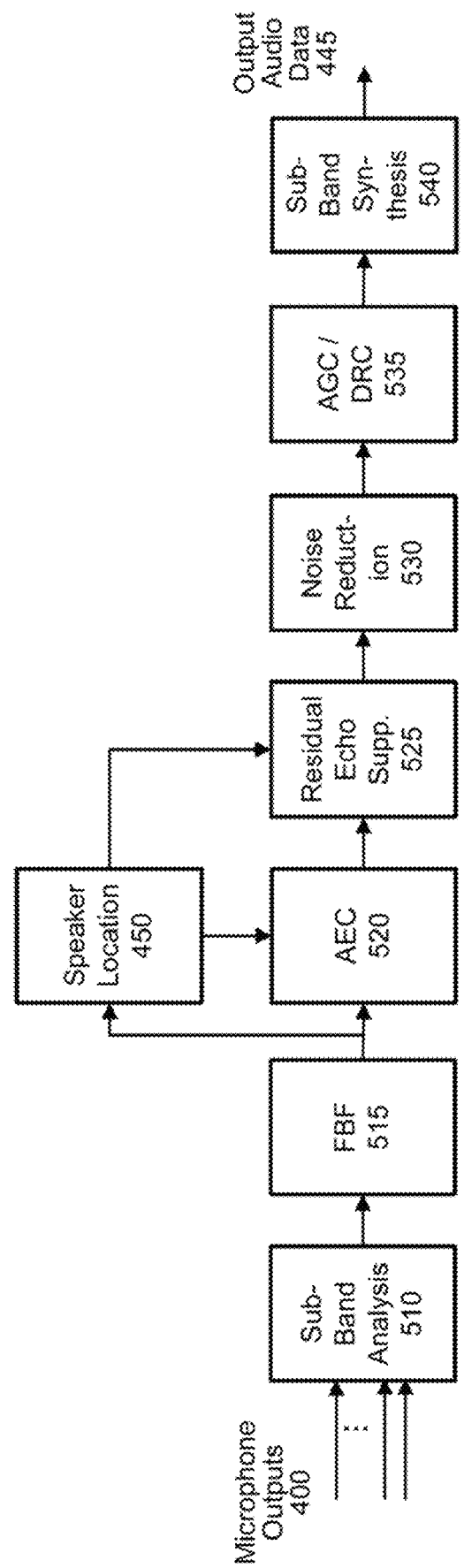
FIG. 5 illustrates a system for echo cancellation that includes speaker location determination according to embodiments of the present disclosure.

FIG. 5 illustrates a system for echo cancellation that includes speaker location determination according to embodiments of the present disclosure. The system includes a sub-band analysis component 450 that receives microphone outputs 400; the sub-band analysis component 450 may include a uniform discrete Fourier transform (DFT) filterbank which converts input audio data 400 in the time domain into a sub-band domain. The audio signal may incorporate audio signals corresponding to multiple different microphones as well as different sub-bands (i.e., frequency ranges) as well as different frame indices (i.e., time ranges). A fixed beamformer 515 receives the sub-band domain data; the output of the fixed beamformer 415 is received by an acoustic echo-canceller 520, as described above. A residual echo suppression component 525 and a noise-reduction component 530 may be used to further reduce echoes and/or noise, and an automatic gain correction/dynamic range compression component 535 may be used to adjust the gain and/or range of the audio data. A sub-band synthesis component 540 may be used to convert the frequency-domain audio data into time-domain output data 445. As explained above, the speaker location determination component 450 may be used to determine when a near-side speaker is quiet or silent and select a beam corresponding to a wireless speaker accordingly.

Figure 6:
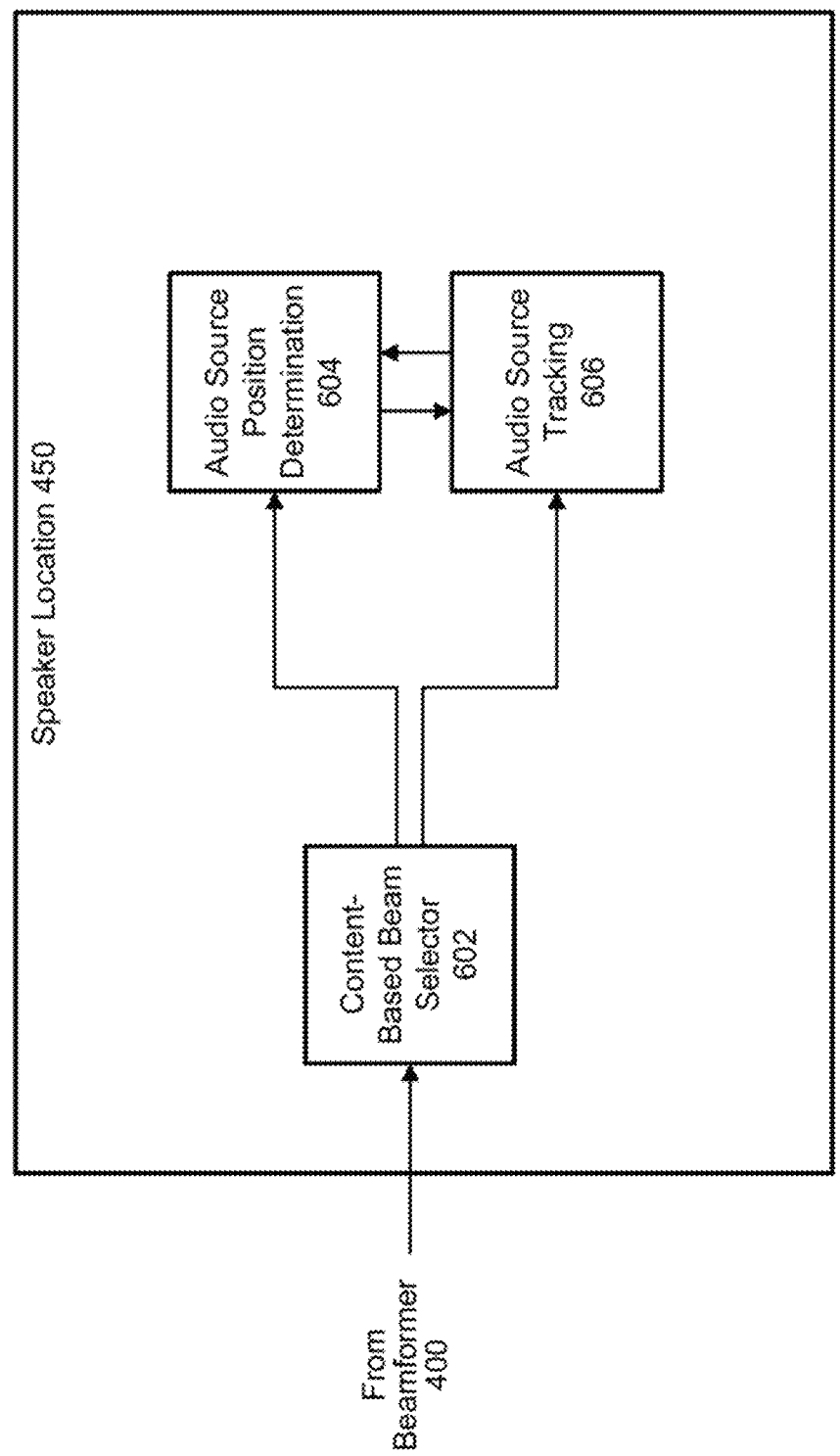
FIG. 6 illustrates a speaker location determination system according to embodiments of the present disclosure.

FIG. 6 illustrates an embodiment of the speaker-location determination component 450. A content-based beam selector 602, which may be a signal-to-interference ratio (SIR) beam selector, selects one or more beams corresponding to one or more wireless loudspeakers 112. An audio-source position determination component 604 may determine a position and/or beam associated with a wireless loudspeaker 112, as described herein, and an audio-source tracking component 606 may be used to track or store position history. The components 604, 606 may be activated when the beam selector 602 (or other component) determines that the loudspeaker 112 is outputting a response to a user query or command and/or when the far-end party of a two-way audio communication is speaking.

Figure 7:
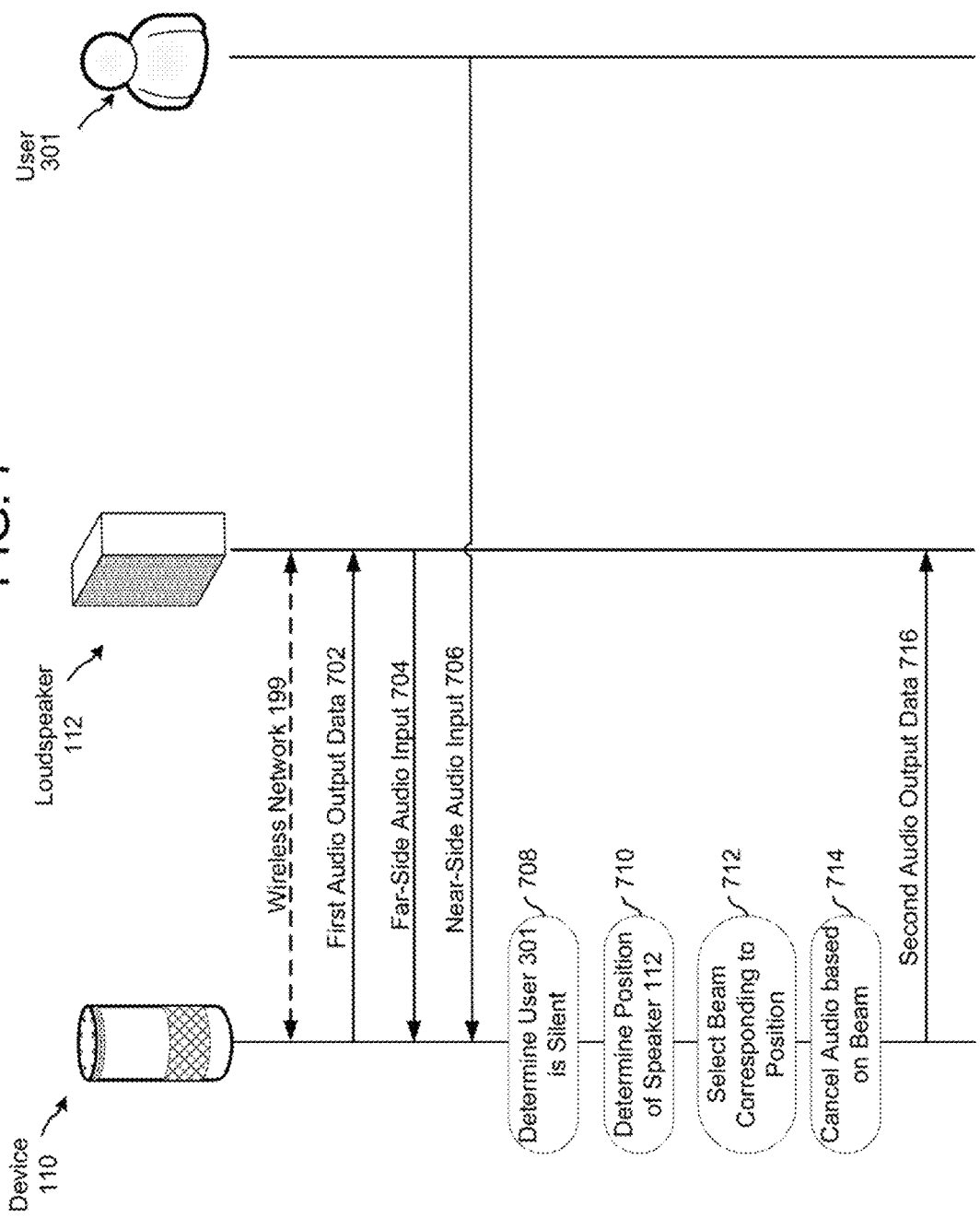
FIG. 7 illustrates data flow in a speaker location determination system according to embodiments of the present disclosure.

FIG. 7 illustrates data flow in a speaker location determination system 450 according to embodiments of the present disclosure. A wireless network 199, such as a Bluetooth or Wi-Fi network, connects the device 110 and the loudspeaker 112. The device 110 sends first audio output data 702 to the speaker for playback thereon; this first audio output data 702 may include echoes produced by the loudspeaker 112. The device 110 may receive far-side audio input 704 from the loudspeaker 112 and/or near-side audio input 706 from the user. The device 110 determines (708) the user 301 is silent and, after determining that the user is silent, determines (710) a position of the loudspeaker 112. As described herein, the speaker location determination system 450 may determine that the user is silent by determining that the user and a second user are participating in a two-way audio communication and that the second user is currently speaking. The speaker location determination system 450 may instead or also determine that the user is silent by determining that the user has uttered a command or request and by determining that audio data corresponding to a response to the command or request is being sent to the loudspeaker 112 and/or is currently being output by the loudspeaker 112 and/or built-in loudspeaker 216. In other embodiments, the speaker location determination system 450 determines a vocal characteristic associated with the voice of the user, such as pitch, timbre, cadence, or any other such attribute, and determines that the user is silent if the determined vocal characteristic is not present in received audio. The device 110 selects (712) a beam corresponding to the position of the loudspeaker 112 and cancels (714) audio based on the selected beam. The device 110 thereafter sends second audio output data 716 to the loudspeaker 112 that omits echoes caused by the loudspeaker 112.

Figure 8:
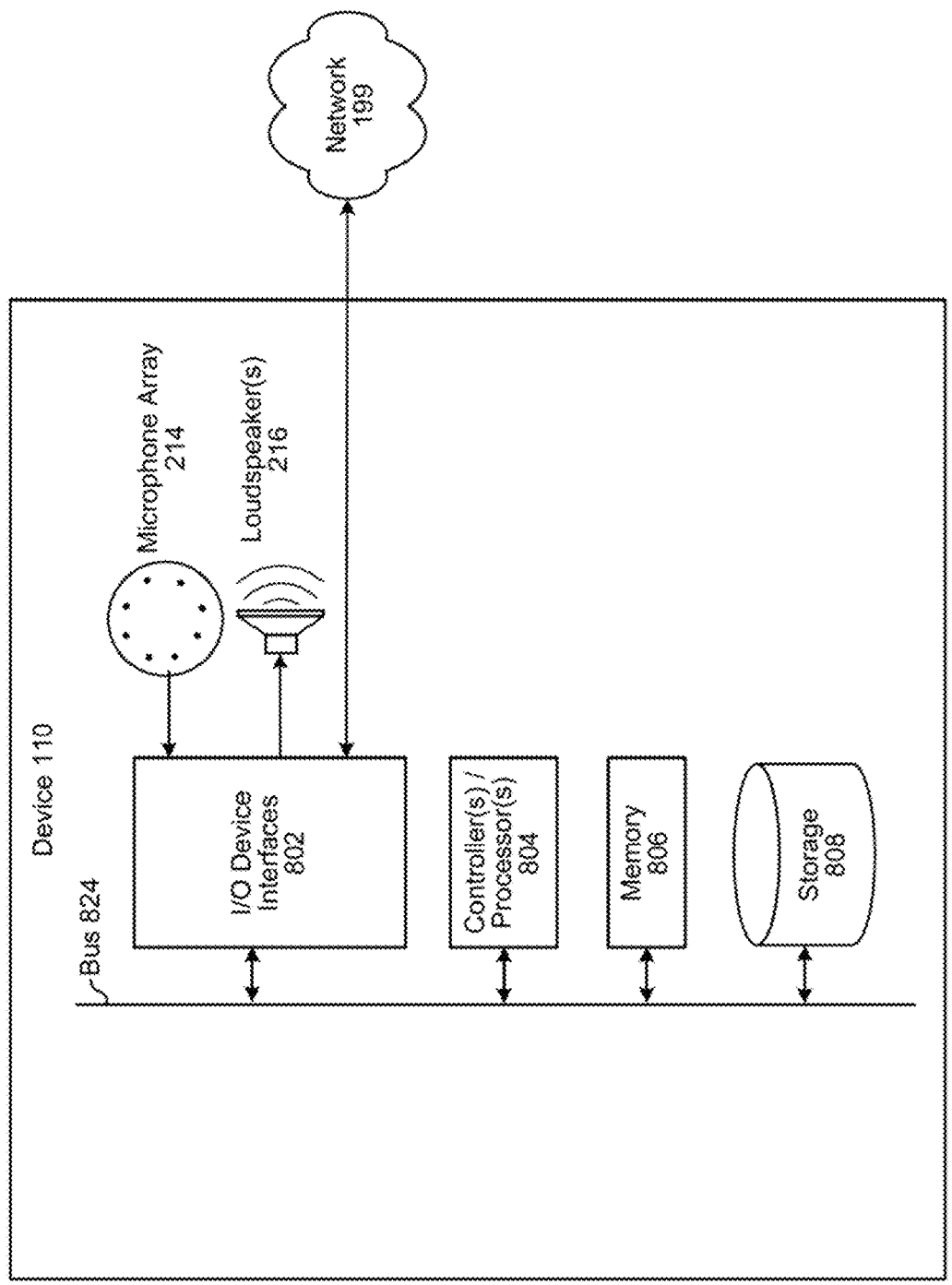
FIG. 8 illustrates a system for echo cancellation that includes speaker location determination according to embodiments of the present disclosure.

FIG. 8 is a block diagram conceptually illustrating example components of the device 110. In operation, the device 110 may include computer-readable and computer-executable instructions that reside on the device, as will be discussed further below.

The device 110 may include one or more audio capture device(s), such as a microphone array 214 which may include a plurality of microphones. The audio capture device(s) may be integrated into a single device or may be separate. The device 110 may also include a built-in audio output device for producing sound, such as built-in loudspeaker(s) 216. The audio output device may be integrated into a single device or may be separate. The device 110 may include an address/data bus 824 for conveying data among components of the device 110. Each component within the device may also be directly connected to other components in addition to (or instead of) being connected to other components across the bus 824.

The device 110 may include one or more controllers/processors 804, which may each include a central processing unit (CPU) for processing data and computer-readable instructions, and a memory 806 for storing data and instructions. The memory 1206 may include volatile random access memory (RAM), non-volatile read only memory (ROM), non-volatile magnetoresistive (MRAM) and/or other types of memory. The device 110 may also include a data storage component 1208, for storing data and controller/processor-executable instructions (e.g., instructions to perform operations discussed herein). The data storage component 808 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1202.

Computer instructions for operating the device 110 and its various components may be executed by the controller(s)/processor(s) 804, using the memory 806 as temporary "working" storage at runtime. The computer instructions may be stored in a non-transitory manner in non-volatile memory 806, storage 808, or an external device. Alternatively, some or all of the executable instructions may be embedded in hardware or firmware in addition to or instead of software.

The device 110 may include input/output device interfaces 802. A variety of components may be connected through the input/output device interfaces 802, such as the microphone array 214, the built-in loudspeaker(s) 216, and a media source such as a digital media player (not illustrated). The input/output interfaces 802 may include A/D converters (not illustrated) and/or D/A converters (not illustrated).

The input/output device interfaces 802 may also include an interface for an external peripheral device connection such as universal serial bus (USB), FireWire, Thunderbolt or other connection protocol. The input/output device interfaces 802 may also include a connection to one or more networks 199 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 899, the device 110 may be distributed across a networked environment.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

As illustrated in FIG. 9, the device 110 may be connected over the network(s) 199. The network(s) 199 may include a local or private network or may include a wide network such as the Internet. Devices may be connected to the network(s) 199 through either wired or wireless connections. For example, the device 110a, a smart phone 902, a smart refrigerator 904, a wireless microphone 906, a tablet computer 908, a desktop computer 910, and/or a laptop computer 912 may be connected to the network(s) 199 through a wireless service provider, over a WiFi or cellular network connection, or the like. Other devices are included as network-connected support devices, such as a server 120. The support devices may connect to the network(s) 199 through a wired connection or wireless connection.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the device 110 may be implemented by a digital signal processor (DSP).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:

receiving, at a voice-controlled device, first input audio data corresponding to a query from a user;

sending, from the voice-controlled device to a wireless loudspeaker, first response audio data corresponding to a response to the query;

receiving, from a first microphone of the voice-controlled device, first microphone audio data including a first representation of response audio corresponding to the first response audio data;

receiving, from a second microphone of the voice-controlled device, second microphone audio data including a second representation of the response audio;

generating, using the first microphone audio data, first directional audio data corresponding to a first direction;

generating, using the second microphone audio data, second directional audio data corresponding to a second direction;

determining that a first volume level corresponding to the first directional audio data is greater than a second volume level corresponding to the second directional audio data;

determining, based on determining that no speech input is received and based on determining that the first volume level is greater than the second volume level, that the first direction is associated with the wireless loudspeaker; and performing echo cancellation using the first directional audio data.

2. The computer-implemented method of claim 1, further comprising:

receiving, at the wireless loudspeaker, input audio corresponding to a first voice communication;
sending second input audio data to a remote device associated with a second user, the second input audio data corresponding to the input audio;
receiving, from the remote device, second response audio data corresponding to a second voice communication;
sending, from the voice-controlled device to the wireless loudspeaker, the second response audio data;
generating, using the first microphone audio data, first processed audio data corresponding to the first direction;
generating, using the second microphone audio data, second processed audio data corresponding to the second direction;
determining that a third volume level corresponding to the first processed audio data is less than a fourth volume level corresponding to the second direction;
determining, based on sending the second response audio data and based on determining that the third volume level is less than the fourth volume level, that the second direction is associated with the wireless loudspeaker; and
performing echo cancellation using the first processed audio data.

3. The computer-implemented method of claim 1, further comprising:
determining a position of the user;
determining the first direction corresponds to the position of the user;
determining a third direction that corresponds to the wireless loudspeaker and does not correspond to the user;
determining first processed audio data corresponding to the third direction; and
performing echo cancellation using the first processed audio data.

4. A computer-implemented method comprising:
sending first audio data to an audio-output device, the first audio data corresponding to first audio;
receiving, from a first microphone during a first time period, second audio data including a first representation of the first audio;
receiving, from a second microphone during the first time period, third audio data including a second representation of the first audio;
determining that no speech input is received during the first time period; and
determining, based at least on the second audio data, the third audio data, and determining that no speech input is received, a position of the audio-output device.

5. The computer-implemented method of claim 4, further comprising:
generating, using the second audio data and the third audio data, fourth audio data corresponding to a first direction; and
generating, using the second audio data and the third audio data, fifth audio data corresponding to a second direction,
wherein determining the position comprises determining that a first volume level of the fourth audio data is greater than a second volume level of the fifth audio data.

6. The computer-implemented method of claim 5, further comprising:

generating output audio data by subtracting at least a portion of the fourth audio data from the fifth audio data; and
outputting the output audio data.

7. The computer-implemented method of claim 5, further comprising:
sending the fourth audio data to a second audio-output device, the fourth audio data corresponding to second audio;
determining, based at least on the second audio data and the third audio data, a second position of the second audio-output device;
generating, using the second audio data and the third audio data, sixth audio data corresponding to a third direction;
generating second output audio data by subtracting at least a portion of the sixth audio data from the fifth audio data; and
outputting the second output audio data.

8. The computer-implemented method of claim 4, further comprising:
receiving, using the first microphone during a second time period prior to the first time period, fourth audio data;
determining that the fourth audio data includes a representation of first speech; and
prior to determining the position, determining that the first audio data lacks a representation of second speech.

9. The computer-implemented method of claim 8, further comprising:
determining, based at least on the representation of the first speech, vocal-characteristic data; and
wherein determining that the first audio data lacks the representation of the first speech further comprises determining, based on the vocal-characteristic data, that the first audio data lacks a vocal characteristic corresponding to the vocal-characteristic data.

10. The computer-implemented method of claim 4, further comprising:
receiving, from the first microphone during a second time period, fourth audio data;
receiving, from the second microphone during the second time period, fifth audio data;
determining that no speech input is received during the second time period; and
determining, based at least on the fourth audio data, the fifth audio data, and determining that no speech input is received, a second position of the audio-output device different from the position.

11. The computer-implemented method of claim 4, further comprising:
determining a position of a user;
determining that a difference between the position of the audio-output device and the position of the user is less than a threshold;
determining a third direction that corresponds to the audio-output device and does not correspond to the user; and
subtracting fourth audio data corresponding to the third direction from the third audio data to create output audio data.

12. The computer-implemented method of claim 4, further comprising:
sending fourth audio data to the audio-output device, the fourth audio data including identification audio data;
receiving, from the first microphone, fifth audio data;
receiving, from the second microphone, sixth audio data;

generating, using the fifth audio data and the sixth audio data, seventh audio data corresponding to a second direction;

determining that the seventh audio data includes a representation of the identification audio data; and determining a second position of the audio-output device corresponding to the second direction.

13. A computing system comprising:

at least one processor; and at least one memory including instructions that, when executed by the at least one processor, cause the computing system to:

send, using a wireless network, first audio data to an audio-output device, the first audio data corresponding to first audio;

receive, from a first microphone during a first time period, second audio data including a first representation of the first audio;

receive, from a second microphone during the first time period, third audio data including a second representation of the first audio;

determine that no speech input is received during the first time period; and determine, based at least on the second audio data, the third audio data, and determining that no speech input is received, a position of the audio-output device.

14. The computing system of claim 13, wherein the at least one memory further includes instructions that, when executed by the at least one processor, further cause the computing system to:

generate, using the second audio data and the third audio data, fourth audio data corresponding to a first direction; and generate, using the second audio data and the third audio data, fifth audio data corresponding to a second direction;

generate output audio data by subtracting at least a portion of the fourth audio data from the fifth audio data; and output the output audio data.

15. The computing system of claim 14, wherein the at least one memory further includes instructions that, when executed by the at least one processor, further cause the computing system to:

send the fourth audio data to a second audio-output device, the fourth audio data corresponding to second audio;

determine, based at least on the second audio data and the third audio data, a second position of the second audio-output device;

generate, using the second audio data and the third audio data, sixth audio data corresponding to a third direction;

generate second output audio data by subtracting at least a portion of the sixth audio data from the fifth audio data; and output the second output audio data.

16. The computing system of claim 13, wherein the at least one memory further includes instructions that, when executed by the at least one processor, further cause the computing system to:

receive, using the first microphone during a second time period prior to the first time period, fourth audio data;

determine that the fourth audio data includes a representation of first speech;

prior to determining the position, determine that the first audio data lacks a representation of second speech.

17. The computing system of claim 16, wherein the at least one memory further includes instructions that, when executed by the at least one processor, further cause the computing system to:

determine, based at least on the representation of the first speech, vocal-characteristic data; and determine, based on the vocal-characteristic data, that the first audio data lacks a vocal characteristic corresponding to the vocal-characteristic data.

18. The computing system of claim 13, wherein the at least one memory further includes instructions that, when executed by the at least one processor, further cause the computing system to:

receive, from the first microphone during a second time period, fourth audio data;

receive, from the second microphone during the second time period, fifth audio data;

determine that no speech input is received during the second time period; and determine, based at least on the fourth audio data, the fifth audio data, and determining that no speech input is received, a second position of the audio-output device different from the position.

19. The computing system of claim 13, wherein the at least one memory further includes instructions that, when executed by the at least one processor, further cause the computing system to:

determine a position of a user;

determine that a difference between the position of the audio-output device and the position of the user is less than a threshold; and determine a third direction that corresponds to the audio-output device and does not correspond to the user; and subtract fourth audio data corresponding to the third direction from the third audio data to create output audio data.

20. The computing system of claim 13, wherein the at least one memory further includes instructions that, when executed by the at least one processor, further cause the computing system to:

send fourth audio data to the audio-output device, the fourth audio data including identification audio data;

receive, from the first microphone, fifth audio data;

receive, from the second microphone, sixth audio data;

generate, using the fifth audio data and the sixth audio data, seventh audio data corresponding to a second direction;

determine that the seventh audio data includes a representation of the identification audio data; and determine a second position of the audio-output device.

* * * * *